Sept. 17, 1935.  W. P. HARTSHORNE  2,014,565
CHOCK BLOCK APPARATUS
Filed Sept. 28, 1934  2 Sheets-Sheet 1

INVENTOR
William P. Hartshorne,
By Archworth Martin,
Attorney.

Sept. 17, 1935.   W. P. HARTSHORNE   2,014,565
CHOCK BLOCK APPARATUS
Filed Sept. 28, 1934   2 Sheets-Sheet 2

INVENTOR
William P. Hartshorne,
By Archworth Martin,
Attorney.

Patented Sept. 17, 1935

2,014,565

UNITED STATES PATENT OFFICE 2,014,565

CHOCK BLOCK APPARATUS

William P. Hartshorne, Darlington Township, Beaver County, Pa.

Application September 28, 1934, Serial No. 745,894

6 Claims. (Cl. 188—30)

My invention relates to chock block apparatus and is hereinafter described as employed for the purpose of preventing trucks of the motor vehicle type from drifting backwards when they have been stopped on a hill, but it will be understood that the invention is capable of use in connection with various other types of vehicles.

If, when a truck is ascending a steep grade, it is stopped through stalling the engine, or for any other reason, it sometimes happens that the driver loses control, with the result that the truck will start backward. Again, in starting the truck, difficulty is frequently experienced in getting it into forward motion, without stalling the motor.

One object of my invention is to provide a chock or blocking apparatus of improved form, which can be instantly rendered operative to hold a truck against backward movement.

Another object of my invention is to provide a chocking apparatus that can be conveniently applied to various types of motor vehicles, without substantial alteration of the vehicle structure.

Still another object of my invention is to provide a chock block apparatus that can be easily moved to inoperative position.

A further object of my invention is to provide a chock block apparatus of generally simplified and improved form.

Figure 1:
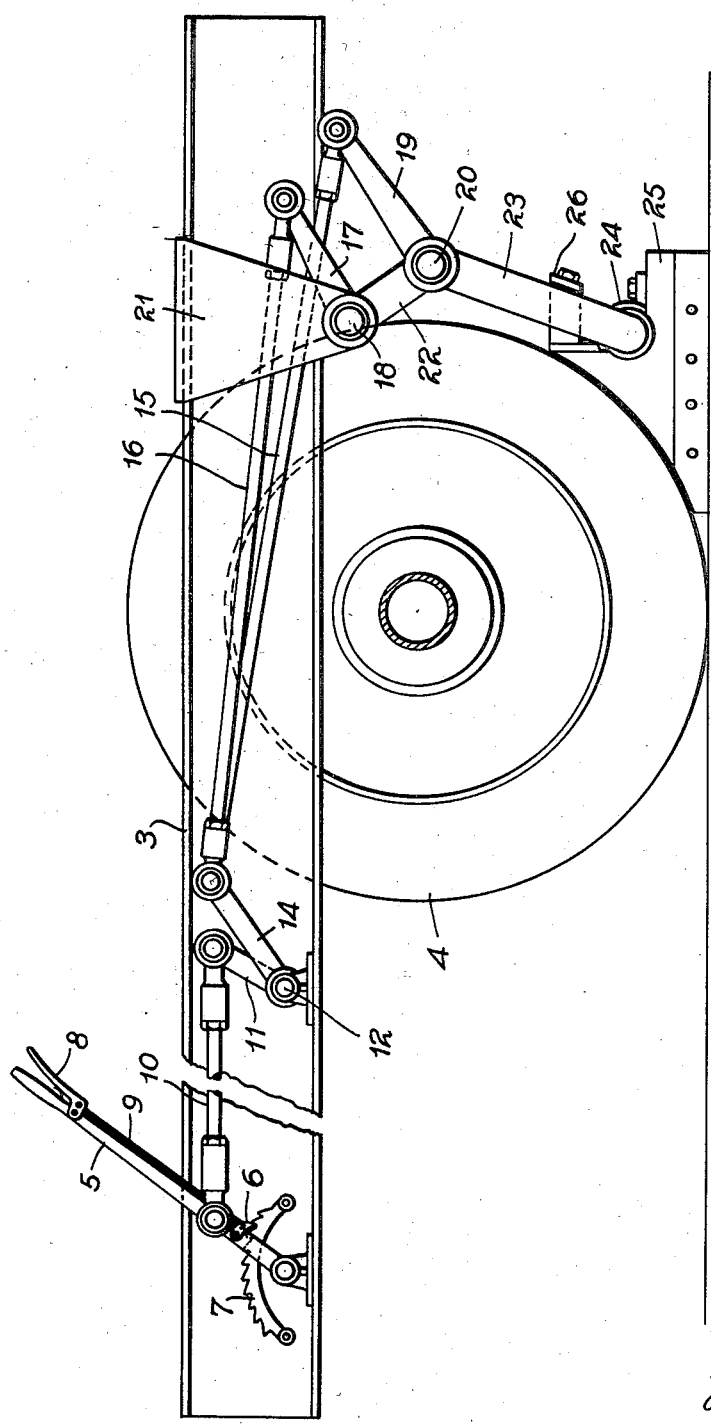
Figure 2:
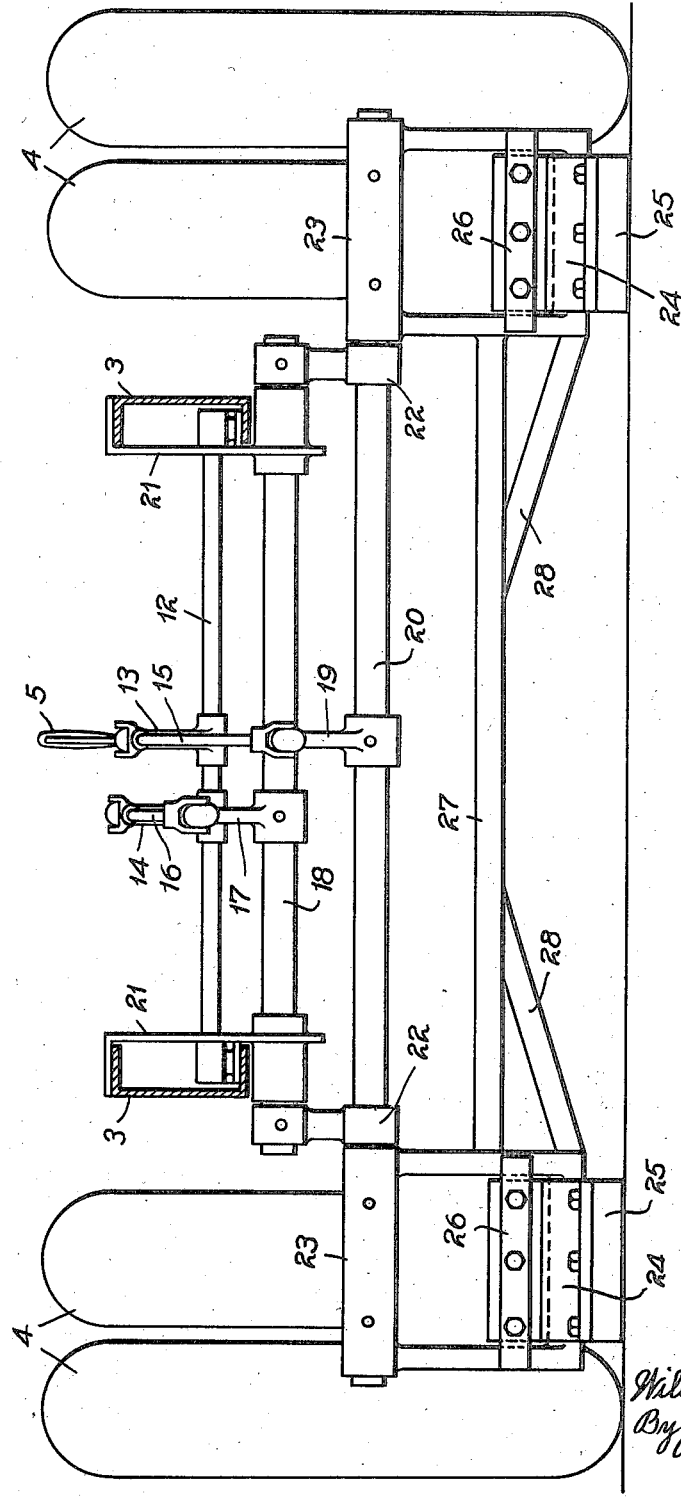

Referring to the accompanying drawings, Figure 1 shows a longitudinal sectional view of the rear portion of a motor truck, and Fig. 2 is a rear view thereof.

The truck is shown as provided with the usual side frames 3 and rear wheels 4. Adjacent to the driver's seat is a chock block operating lever 5 which may be operated in substantially the same manner as brake levers of well-known form. The lever 5 is provided with a pawl 6 which engages the teeth of a ratchet or rack bar 7, the pawl being lifted to release position by means of the pivoted handle 8 that operates through a link 9, which is connected to the pawl. The lever 5 is pivoted at its lower end to the vehicle frame, and has pivotally connected thereto the front end of a link or pull rod 10. The rear end of the link 10 has pivotal connection with a crank arm 11 that is secured to a rock shaft 12, the ends of the rock shaft 12 being journaled in suitable bearings that are carried by the side frames 3.

The shaft 12 has also secured thereto crank arms 13 and 14 that are respectively connected to pull rods or links 15 and 16. The link 16 is connected to a crank arm 17 that is rigidly secured to a rock shaft 18, while the link 15 has connection with a crank arm 19 that is secured to a floating rock shaft 20.

The rock shaft 18 is supported from the frame by brackets 21, in the lower ends of which the shaft is journaled. The shaft 18 carries a pair of arms 22 that are rigidly secured to the shaft at their upper ends, and at their lower ends rotatably support the shaft 20. The shaft 20 carries at each end a yoke-like bracket 23 that is keyed to the shaft. The legs of the yoke are inturned at their lower ends and extend into bearings 24 which carry chock blocks 25.

The blocks 25 are tiltable in the yokes 23, the tilting movement, however, being limited by brackets 26, which are bolted to the blocks, so that the blocks 25 can be readily manipulated and are automatically adjustable to road surfaces, but they will not tilt so far as to prevent them from assuming proper positions when swung into operative positions behind the wheels.

A tie bar 27 and brace bars 28 connect the yokes 23 to one another so as to brace them and assist in maintaining them in proper alinement relative to each other and to the vehicle frame.

It will be seen that when the operating lever 5 is pushed forwardly, the crank arms 17 and 19 will be swung in counter-clockwise directions. Since the shaft 18 turns on a fixed axis, the crank arms 22 will be swung in such direction as to impart lifting movement to the shaft 20. Simultaneously, the shaft 20 will be rocked by the crank arm 19, thus swinging the lower ends of the yokes 23 and the blocks 25 rearwardly. It will be seen that a combined lifting and backward swinging movement is thereby imparted to the blocks 25, and this constitutes an important feature of my invention.

If the shaft 20 turned only on a fixed axis, it will be seen that it would be practically impossible to operate the crank 19 and swing the blocks 25 backwardly, because they would be pushed against the road. If the crank 19 were omitted, operation of the cranks 22 would result in lifting the blocks upwardly against the wheels, and not give sufficient rearward swinging movement thereto.

In proceeding up a hill, or when starting up a hill, the driver may move the lever 5 such a distance as to cause the blocks 25 to barely clear the pavement, so that in case of engine failure or other condition causing stoppage of the truck, the blocks can be quite quickly lowered to operative position.

I claim as my invention:—

1. The combination with a vehicle, of blocking apparatus therefor comprising a pair of chock blocks for wheels of the vehicle, a rock shaft, crank arms secured to said shaft and pivotally connected to the blocks, and means on the vehicle for moving the shaft in a generally vertical direction and simultaneously turning it on its axis.

2. The combination with a vehicle, of blocking apparatus comprising an operating lever, a rock shaft operatively connected to the lever and movable on a fixed axis, a crank arm secured at one end to the said rock shaft, a second rock shaft pivotally connected to the other end of the crank arm, a second crank arm secured to the second-named rock shaft and connected to the said lever, and a chock block carried by the second-named rock shaft, whereby the block may be moved to and from blocking position behind a wheel of the vehicle.

3. The combination with a vehicle, of blocking apparatus therefor, comprising a rock shaft, an arm connected at its upper end to said shaft, a chock block connected to the lower end of said arm, means for moving the said shaft in a generally vertical direction, and means for simultaneously swinging the said arm about the axis of the shaft, to move the block to and from blocking position behind a wheel.

4. The combination with a vehicle, of blocking apparatus therefor, comprising a pair of chock blocks for the wheels of the vehicle, a rock shaft mounted on the vehicle frame, a pair of crank arms each secured at one end to the rock shaft, a second rock shaft pivotally connected to the other ends of said arms, a second pair of crank arms secured to the second-named rock shaft at their upper ends, and at their lower ends connected to the chock blocks, an operating lever, and crank connections between the said lever and the said rock shafts.

5. The combination with a vehicle, of blocking apparatus therefor, comprising an operating lever mounted adjacent to the forward end of the vehicle, a rock shaft mounted on the vehicle intermediate the ends thereof, a crank connection between the lever and the rock shaft, a second rock shaft carried by the frame, a third rock shaft radially offset and carried by the second-named rock shaft, crank connections between the two second-named rock shafts and the first-named rock shaft, and a chock block carried by the third-named rock shaft.

6. The combination with a vehicle, of blocking apparatus therefor, comprising an operating lever mounted adjacent to the forward end of the vehicle, a rock shaft mounted on the vehicle intermediate the ends thereof, a crank connection between the lever and the rock shaft, a second rock shaft carried by the frame, a third rock shaft radially offset and carried by the second-named rock shaft, crank connections between the two second-named rock shafts and the first-named rock shaft, and a chock block pivotally connected to the third-named rock shaft.

WILLIAM P. HARTSHORNE.